J. H. KIRKPATRICK.
MILK BUCKET.
APPLICATION FILED JULY 19, 1919.
1,325,852.
Patented Dec. 23, 1919.
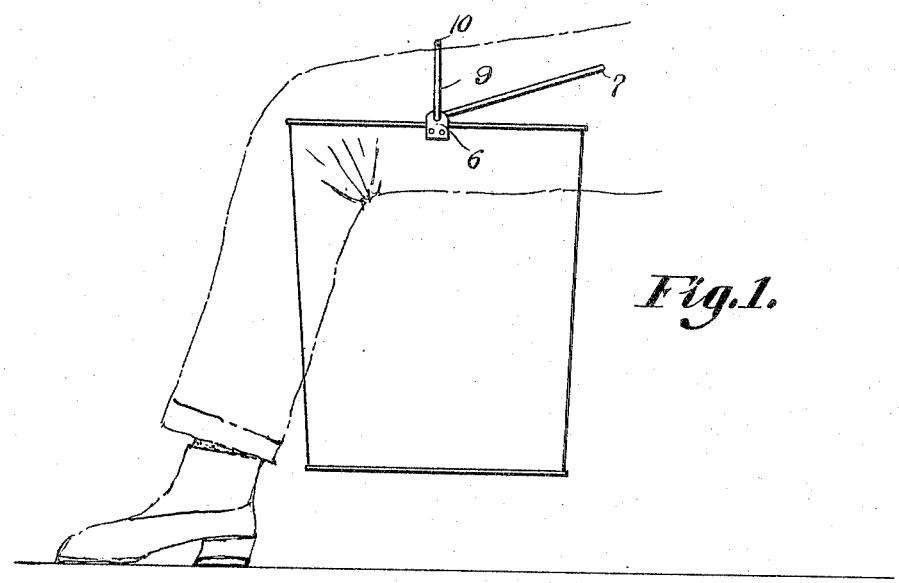
Fig.1.
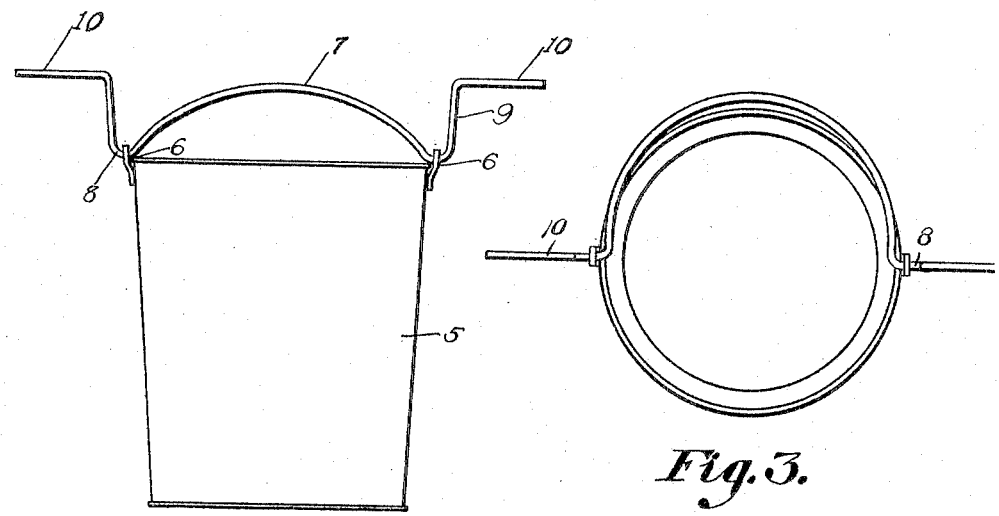
Fig.2.
Fig.3.
J. H. Kirkpatrick,
Inventor
By C. A. Snow & Co.
Attorneys
Witness

UNITED STATES PATENT OFFICE.

JAMES H. KIRKPATRICK, OF FERNDALE, WASHINGTON.

MILK-BUCKET.

1,325,852.  Specification of Letters Patent.  Patented Dec. 23, 1919.

Application filed July 19, 1919. Serial No. 311,951.

*To all whom it may concern:*

Be it known that I, JAMES H. KIRKPATRICK, a citizen of the United States, residing at Ferndale, in the county of Whatcom and State of Washington, have invented a new and useful Milk-Bucket, of which the following is a specification.

The present invention relates to bails for milking buckets, the primary object being to provide a bail of such construction as to rest upon the milker's legs to support the bucket in position while milking, thus obviating the ordinary tiresome operation of grasping the milk pail between the milker's legs.

A further object of the invention is to provide a bail for a milking pail which will support the milking pail in a proper position for milking and which when in such position the bail will be disposed in an angular position so that the same may be readily grasped and which when in such position the operator may lean against the bail to rock the same on its bearing to cause the bail to grip the operator's legs, thus pivoting the pail from sliding.

With above and other objects and advantages in mind the invention consists of the combination of elements, constructions and arrangements, operation and general assemblage, the details of which will be hereinafter enlarged upon and recited in the subjoined claim.

In the drawing:

Figure 1, is a side elevation of a milking pail supported in the operative position.

Fig. 2, is an elevation of the pail taken at right angles to Fig. 1, and

Fig. 3, is a plan view of the pail.

Referring to the drawing wherein like characters of reference designates like parts in all the views the numeral 5 designates a milking pail of usual construction provided with ears 6 at its upper end. My improved bail consists of a length of stout wire indicated at 7.

The intermediate portion is bowed to constitute a handle, the ends of the bowed portion, being formed into curved portions 8, loosely fitted within the ears 6, the ends thereof extending upwardly as at 9, and outwardly to provide the horizontally disposed wings, 10, adapted to rest upon the limbs of the operator to support the milking pail in proper operative position. When the pail is in operative position, the handle of the bail is disposed at an angle and extends rearwardly to one side of the pail where the milk will not contact therewith upon passing into the pail and which in such a position as to be readily grasped by the operator. It will be seen that upon pressing downwardly upon the bail the latter will be rocked in the ears 6 and cause the wings 10 to grip the operator's limbs, thus preventing the pail from slipping.

The embodiment of the invention here illustrated and described is one form of the invention and it will be understood that the same may be modified in many respects and of such limits of modification as may be governed by what is claimed.

What is claimed is:

In a milking pail, apertured ears formed at the upper end thereof, a bail including a curved handle portion the ends thereof terminating in curved portions, disposed within the apertured ears, and having relatively straight portions formed integral therewith, and right angled wings forming continuations of the bail.

In testimony that I claim the foregoing as my own, I have hereto affixed my signature in the presence of two witnesses.

JAMES H. KIRKPATRICK.

Witnesses:
A. F. STONE,
ANNIE THOMPSON.